Jan. 13, 1953 L. A. CURRIER ET AL 2,625,280
FLUID CONDUCTING MEANS FOR THE SHOVEL
CENTERING MEANS OF SHOVEL LOADERS
Filed Nov. 6, 1945 5 Sheets-Sheet 1

Inventors:
Leslie A. Currier.
Fiesco B. Engel.
by Charles F. Osgood,
Att'y.

Jan. 13, 1953 L. A. CURRIER ET AL 2,625,280
FLUID CONDUCTING MEANS FOR THE SHOVEL
CENTERING MEANS OF SHOVEL LOADERS
Filed Nov. 6, 1945 5 Sheets-Sheet 2
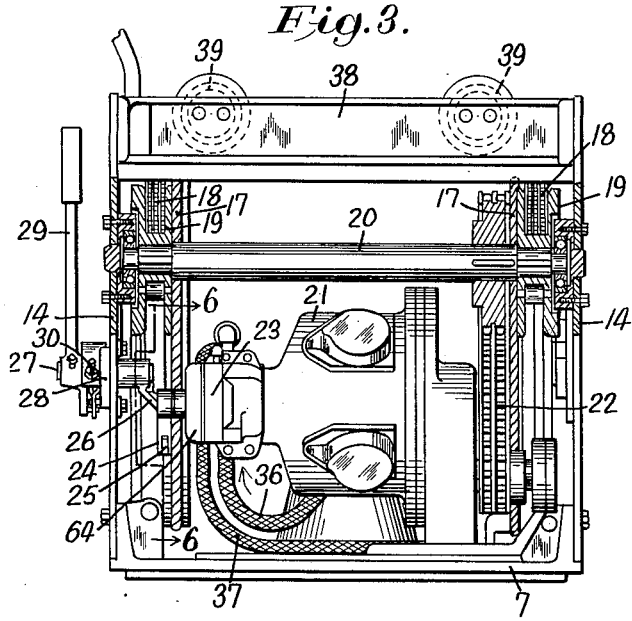
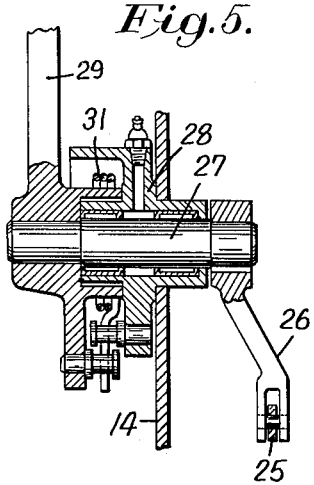
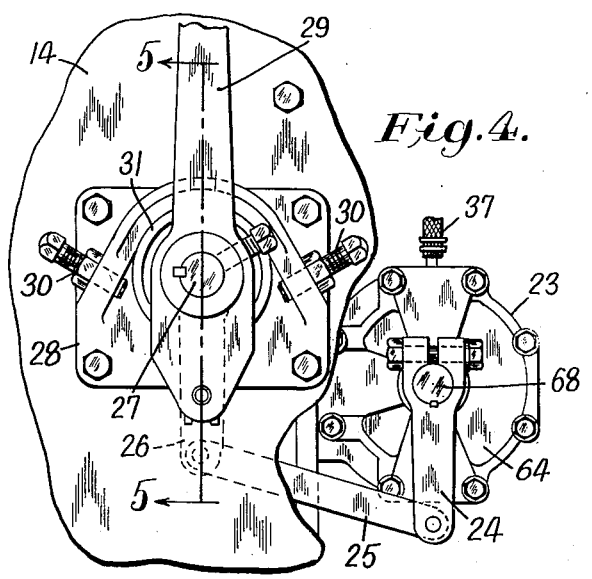
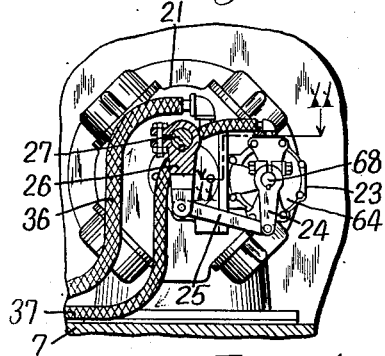
Inventors:
Leslie A. Currier.
Fiesco B. Engel.
by Charles F. Osgood,
Atty.

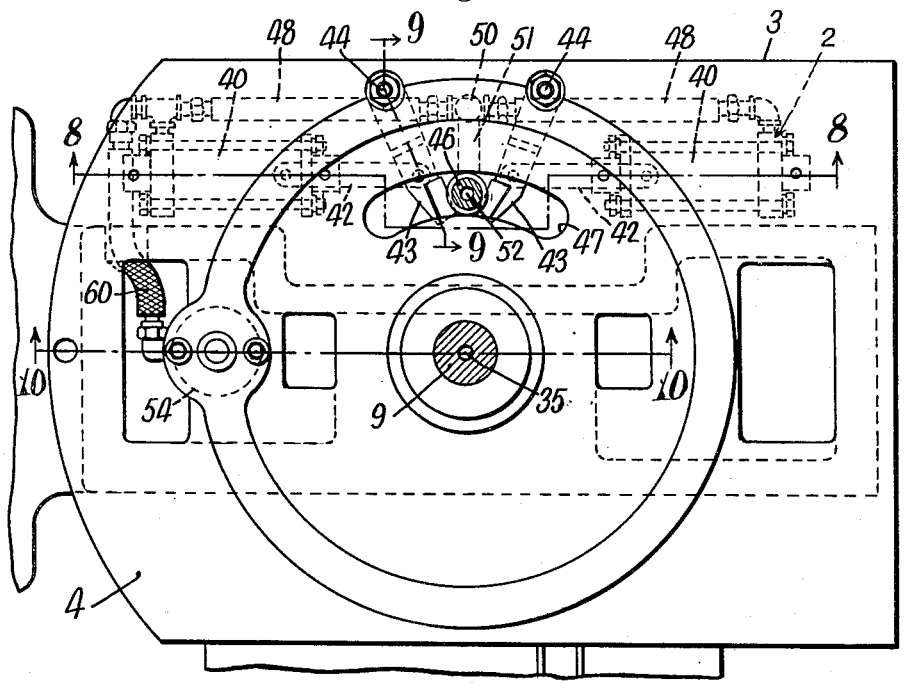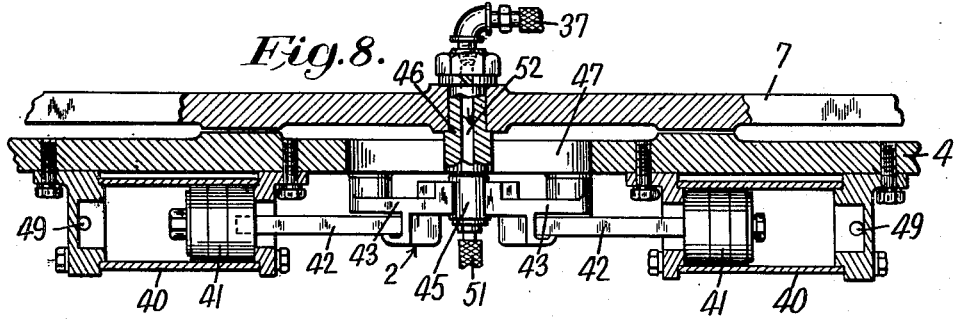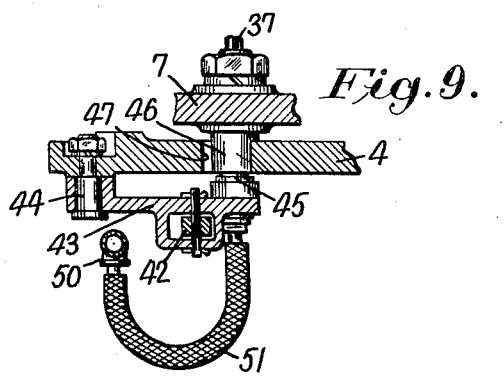

Jan. 13, 1953    L. A. CURRIER ET AL    2,625,280
FLUID CONDUCTING MEANS FOR THE SHOVEL
CENTERING MEANS OF SHOVEL LOADERS
Filed Nov. 6, 1945    5 Sheets-Sheet 4
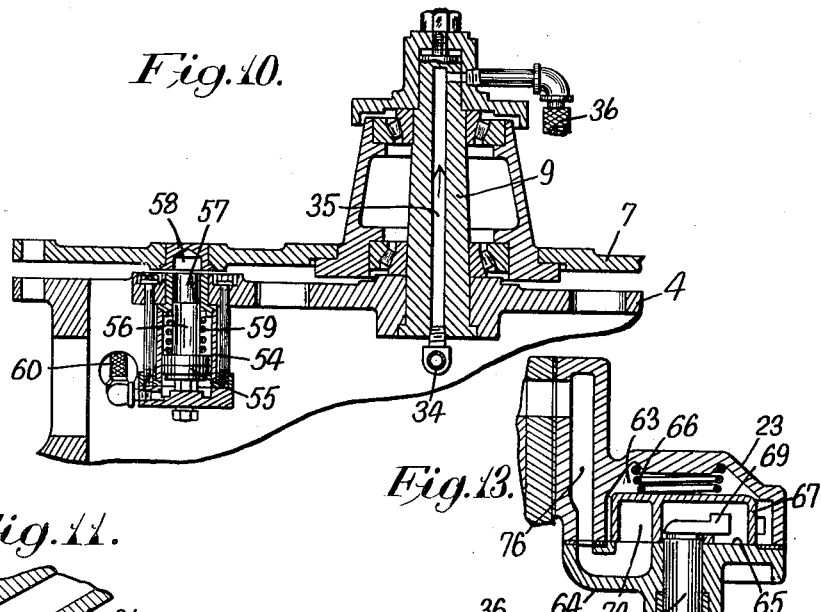
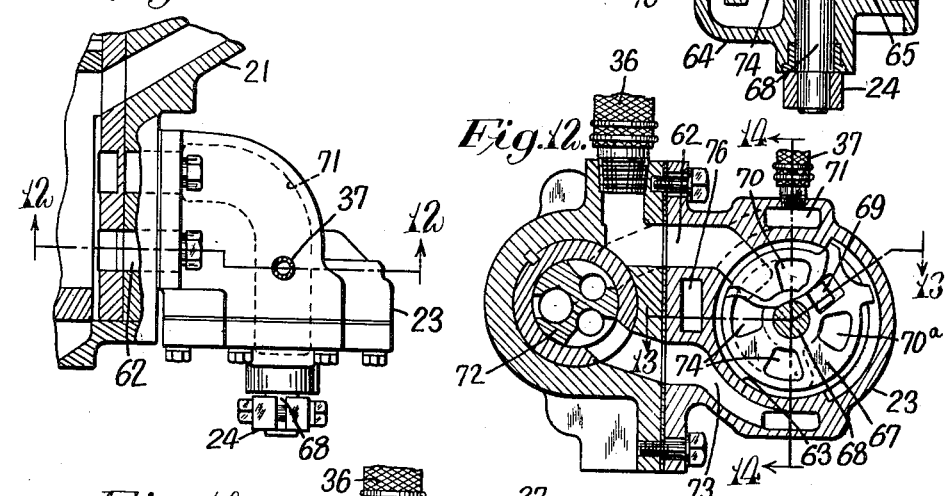
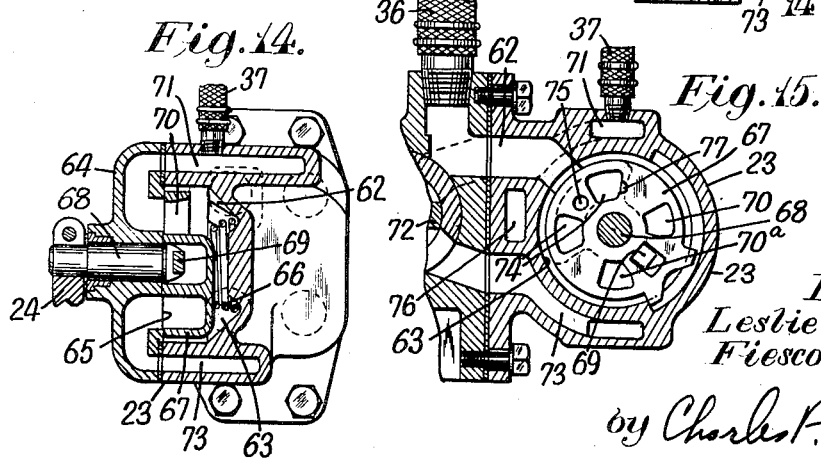
Inventors:
Leslie A. Currier.
Fiesco B. Engel.
by Charles F. Osgood,
atty.

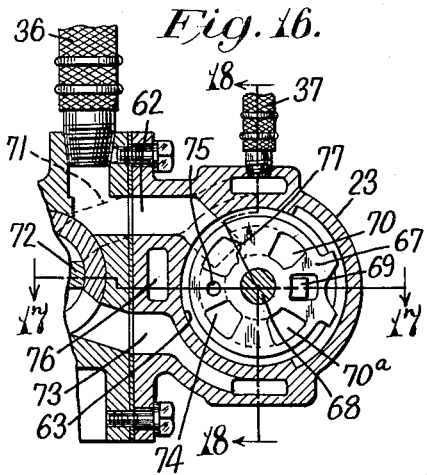
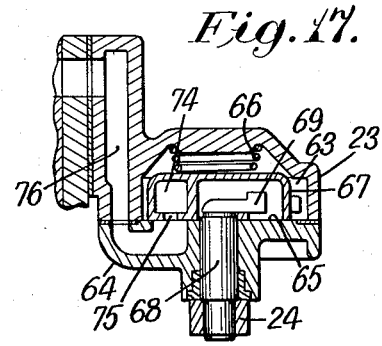
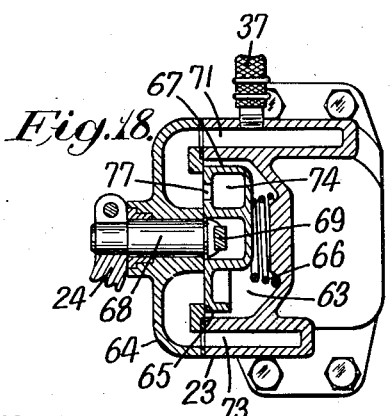
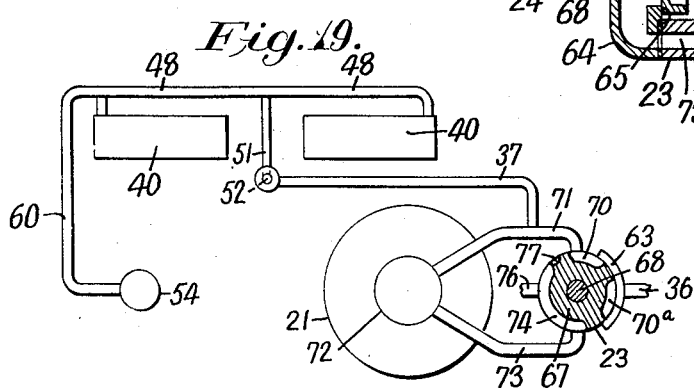
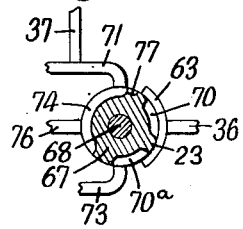
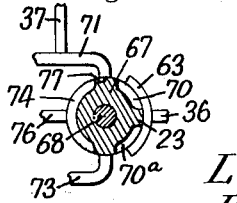

Patented Jan. 13, 1953

2,625,280

UNITED STATES PATENT OFFICE 2,625,280

FLUID CONDUCTING MEANS FOR THE SHOVEL CENTERING MEANS OF SHOVEL LOADERS

Leslie A. Currier and Fiesco B. Engel, Claremont, N. H., assignors to Joy Manufacturing Company, a corporation of Pennsylvania Application November 6, 1945, Serial No. 626,996

2 Claims. (Cl. 214—132)

This invention relates to material loading apparatus, and more particularly has reference to an improved shovel loader having improved means for automatically centering the shovel with respect to the loader base as the shovel moves upwardly from a laterally located digging position toward its raised dumping position.

In material loading apparatus of the shovel loader type, sometimes known as mine car loaders, the shovel is usually mounted on a turntable on a portable base to swing laterally into digging position at either side of the base to enable loading of material at either side of the trackway, and is also mounted to swing in a vertical direction relative to its turntable mounting between its lowered digging position and its raised dumping position. The shovel is usually swung by hand laterally on its turntable mounting to locate the shovel in the desired lateral digging position at the side of the trackway, and it is desirable that the shovel be automatically alined with the base as the shovel moves upwardly from its digging position so that dumping of the shovel contents into a mine car located on the trackway rearwardly of the loader is assured. Heretofore, certain known types of shovel loaders have been provided with means for automatically centering the shovel on the base, but such automatic centering means involved a relatively complicated mechanism actuated directly by the shovel supporting structure, or a geared mechanism driven by the shovel raising motor.

In accordance with the present invention, the shovel of the shovel loader is automatically centered with respect to the loader base as the shovel is raised from its digging position by power operated means which is entirely independent of the shovel supporting and raising mechanism so that the entire power of the shovel raising motor is utilized in the raising of the shovel. In a preferred embodiment the automatic centering means comprises oppositely acting fluid motors in the form of fluid cylinders which reecive their supply of pressure fluid from the same power source as the shovel raising motor, and, in one embodiment, the fluid supply for the centering motors is connected directly to the motor supply passage so that when the shovel motor is operated to raise the shovel fluid is concurrently supplied to the centering motors to effect centering. In a specific embodiment the fluid supply to the shovel raising motor, which is of the reversible type, is controlled by a reversing valve, so that when the valve is positioned to operate the shovel motor in a direction to raise the shovel, fluid is concurrently supplied to the centering cylinders, and conversely when the reversing valve is positioned to reverse the shovel motor to effect lowering of the shovel the fluid in the centering cylinders is automatically vented to atmosphere. The reversing valve is so designed that when it is in neutral position and the shovel motor is shut down, the centering motors are vented. Thus, when the shovel raising motor is shut down or reversed to lower the shovel, the centering cylinders are automatically rendered ineffective so that the shovel may be easily moved laterally by hand on its turntable mounting relative to the base.

It is accordingly an object of the present invention to provide an improved automatic centering means for the shovel of a material loading apparatus of the shovel loader type so that dumping of the shovel contents at the proper location, rearwardly of the loader base, is assured. Another object is to provide an improved automatic shovel centering means for a shovel loader wherein the power for effecting centering is derived from a source other than the shovel raising motor. A further object is to provide an improved fluid operated automatic centering mechanism which receives its supply of operating fluid from the supply passage of the shovel raising motor under the control of the motor control valve. A still further object is to provide an improved power operated means for automatically centering the shovel with respect to the loader base as the shovel is raised by its reversible raising motor under the control of the motor reversing valve, and embodying means for rendering the centering means ineffective when the reversing valve is moved into its position to effect reversal of the shovel motor to permit lowering of the shovel. Still another object is to provide an improved automatic shovel centering means of the cylinder and piston type which derives its power wholly independently of the shovel raising motor, and which is automatically rendered effective when the shovel raising motor is operated to raise the shovel from its digging position. A further object is to provide an improved fluid operated shovel centering means which has fluid supplied thereto to effect centering of the shovel whenever fluid is supplied to the shovel raising motor to raise the shovel, and which is automatically vented whenever the shovel raising motor is shut down or reversed. A still further object is to provide an improved fluid conducting means between the fluid supply connection on the swiveled turntable mounting and the centering cylinders on the loader base, and embodying a fluid conducting passage extending through an element of the shovel centering means. These and other objects and advantages of the invention will, however, hereinafter more fully appear.

In the accompanying drawings there is shown for purposes of illustration one form which the invention may assume in practice.

In these drawings:

Fig. 3 is an enlarged cross-sectional view taken substantially on line 3—3 of Fig. 1.

Fig. 4 is an enlarged fragmentary view in side elevation, illustrating a portion of the control means for the shovel raising motor and centering means.

Fig. 5 is a detail vertical sectional view taken on line 5—5 of Fig. 4.

Fig. 6 is a vertical section taken on line 6—6 of Fig. 3.

Fig. 7 is an enlarged horizontal sectional view taken substantially on line 7—7 of Fig. 1.

Fig. 8 is an enlarged view in longitudinal vertical section taken substantially on line 8—8 of Fig. 7, illustrating the centering cylinders.

Fig. 9 is a detail vertical sectional view taken on line 9—9 of Fig. 7.

Fig. 10 is a view in vertical longitudinal section taken substantially on line 10—10 of Fig. 7.

Fig. 11 is an enlarged horizontal sectional view taken substantially on line 11—11 of Fig. 6, with the reversing valve shown in top plan.

Fig. 12 is a vertical sectional view taken on line 12—12 of Fig. 11, showing the reversing valve in shovel raising and centering position.

Fig. 13 is a horizontal sectional view taken on line 13—13 of Fig. 12.

Fig. 14 is a vertical sectional view taken on line 14—14 of Fig. 12.

Fig. 15 is a vertical sectional view taken on the plane of Fig. 12, showing the reversing valve in shovel lowering position with the centering cylinders vented.

Fig. 16 is a sectional view similar to Fig. 15, showing the reversing valve in neutral position with the centering cylinders vented.

Fig. 17 is a horizontal sectional view taken on line 17—17 of Fig. 16.

Fig. 18 is a vertical sectional view taken on line 18—18 of Fig. 16.

Fig. 19 is a diagrammatic view showing the reversing valve and its associated fluid connections, with the reversing valve in shovel raising and centering position.

Figs. 20 and 21 are diagrammatic views showing the reversing valve of Fig. 19 respectively in shovel lowering and neutral positions with the centering cylinders vented.

Figure 1:
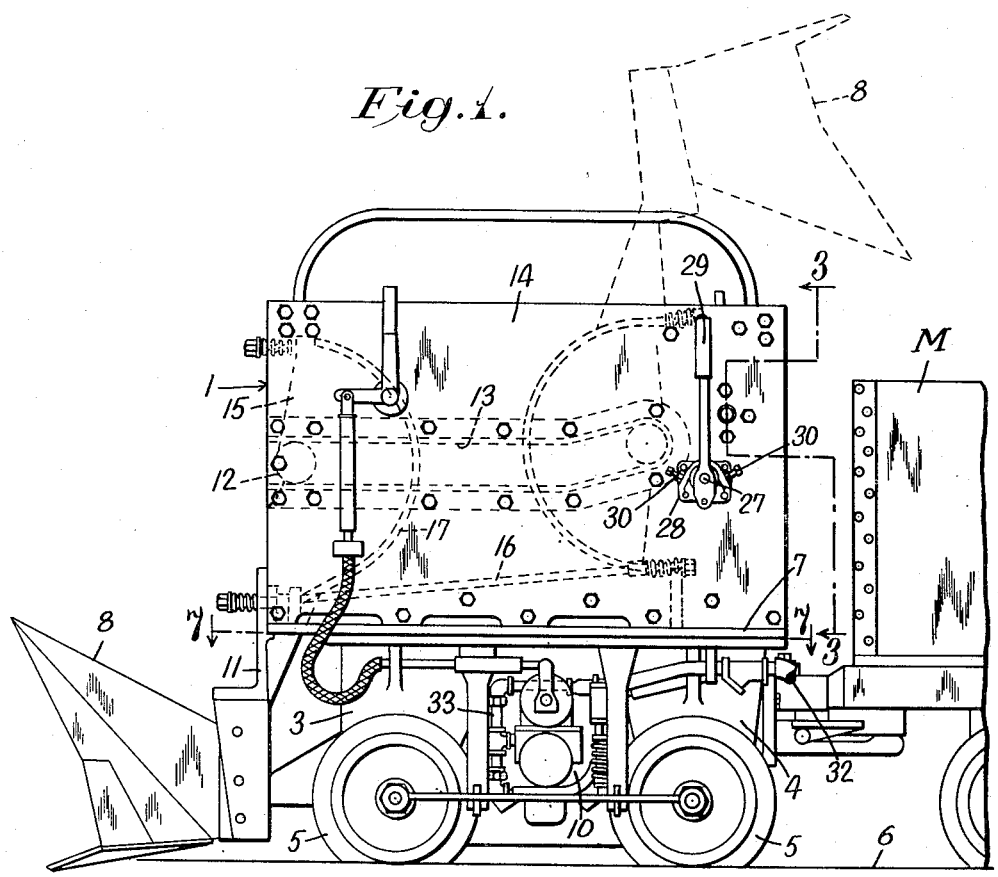
Fig. 1 is a side elevational view of a shovel loader in which an illustrative form of the invention is embodied, and showing a mine car coupled to the rear end of the loader.
Figure 2:
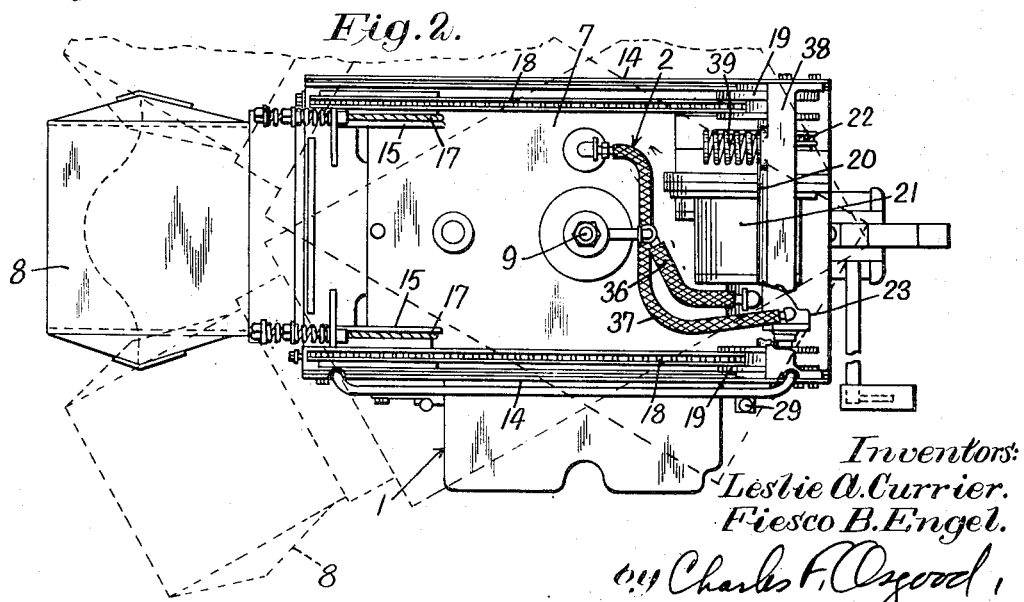
Fig. 2 is a plan view of the shovel loader shown in Fig. 1.

In this illustrative embodiment of the invention, there is shown a material loading apparatus of the shovel loader type generally designated 1 in which the improved automatic shovel centering mechanism, generally designated 2, is embodied. The shovel loader may be of the same general character as that disclosed in a patent to R. C. Osgood, No. 2,269,570, dated January 6, 1942, and comprises a portable base 3 having a base frame 4 mounted on wheels 5 adapted to travel along a trackway 6. Swiveled on the base is a swivel frame or turntable 7 on which a vertically swingable shovel or bucket 8 is mounted. The base frame 4 has fixed thereto a vertical shaft 9 supporting bearings on which the turntable is journaled, and the turntable may be turned on its bearing mounting into positions to locate the shovel laterally at either side of the base so that the shovel may dig into the material to be loaded at either side of the trackway. As disclosed in the patent above referred to, a conventional reversible fluid motor 10 on the base frame 4 beneath the turntable is operatively connected to the wheels 5 for propelling the loader back and forth along the trackway, and the traction of the wheels is utilized to effect digging of the shovel forwardly into the material to be loaded. Coupled to the rear end of the loader base is a mine car M having its wheels guided on the trackway.

As is also fully described in the above mentioned patent, the shovel or bucket 8 is supported by arms 11 which carry rolls 12 guided in substantially horizontal guideways 13 on the inner sides of the vertical side plates 14 on the turntable. Thus the rollers provide a rolling pivotal support for the shovel and the shovel supporting arms are swingably supported to turn on axes coincident with the roll support axes as the shovel is swung about its fulcrum point, and as the shovel is swung upwardly from its digging position, the rollers move rearwardly along the guideways and the guideways serve to confine the shovel as it swings upwardly to movement in a predetermined curved path. Secured to the arms are segments 15 of semi-circular shape (see Fig. 1) having cable guiding grooves for receiving pairs of flexible spring-tensioned cables 16, 16 and 17, 17 each of which is secured at one end to the shovel arms and at its other end to the turntable. These pairs of cables serve to compel swinging movement of the arms thereby to effect movement of the shovel side arms bodily longitudinally as they are swung, and to provide, in effect, a moving fulcrum point for the shovel; and they serve to effect movement of the shovel through a wide arc as it moves between its lowered digging position and its raised dumping position. The arm segments, roller mounting and cable connections are fully described in the patent above referred to.

For raising and lowering the shovel on its roller mounting, there are, in this instance, provided side chains 18 fastened to the shovel arms and wound on drums 19 (Fig. 3) fixed to a transverse shaft 20 suitably journaled in bearings supported by the vertical side plates 14. A conventional reversible fluid motor 21 is mounted on the turntable and has its power shaft connected through a chain and sprocket drive 22 to the drum shaft 20. The motor has a conventional reversing valve 23, to be later described in detail, operated by a lever arm 24 connected by a link 25 to a lever arm 26 keyed to a horizontal shaft 27. The shaft 27, as shown in Fig. 5, is journaled in bearings supported by a bracket 28 fixed to the outer side of the vertical side plates 14 and has keyed thereto at its outer end an operating handle 29. Suitable adjustable stops 30, 30 (Fig. 4) are carried by the bracket for limiting the range of swing of the handle 29, and a coil spring 31 (Fig. 5) connected between the bracket and the handle constantly urges the handle toward its central or neutral position.

Pressure fluid may be supplied to the motors 10 and 21 through a supply hose 32 on the base coupled to branched pipe connections 33 and 34 arranged on the base frame beneath the turntable. The pipe connection 34 is connected to an axial passage 35 in the stationary vertical shaft 9 (Fig. 10) and the passage 35 is in turn connected by a hose 36 to the fluid supply for the shovel raising motor 21. Pressure fluid may flow to the automatic centering mechanism 2 for the shovel through a hose 37 also under the control of the motor reversing valve 23 in an improved manner as will hereinafter be fully described. Carried by a cross plate 38, which braces the vertical side plates 14, are spring buffers 39, 39 engageable by the shovel supporting arms to provide a cushioned stop for the shovel when the latter assumes its raised dumping position as indicated in dotted lines in Fig. 1. When the rearward movement of the shovel is abruptly stopped by the buffer springs, the shovel contents are discharged into the mine car M. The buffer springs also initiate forward movement of the shovel from its dumping position and when the center of gravity is passed, the shovel will drop down under its own weight. To speed up the return of the shovel, the shovel raising motor 21 may be reversed to rotate the cable drums 19 in unwinding direction to slacken the side chains 18 so that the shovel may freely drop down into its digging position.

The automatic centering mechanism 2 serves to aline the shovel with respect to the loader base as the shovel moves upwardly from a laterally located digging position so that discharge of the shovel contents into the mine car M is assured. This centering mechanism may be generally similar to that shown in the R. C. Osgood Patent 2,365,773, dated December 26, 1944, and comprises alined fluid motors preferably in the form of fluid cylinders 40, 40 extending longitudinally along one side of the base frame beneath the turntable and containing oppositely acting reciprocable pistons 41, 41. These pistons are pivotally connected by links 42 to horizontally swingable arms 43, 43 pivoted on vertical pivot pins 44 secured to the top of the base frame. These arms are swingable horizontally into engagement with a roller 45 (Fig. 8) journaled on the lower end of a vertical pin 46 (Fig. 8) secured to the swivelled turntable 7. This pin projects vertically through an arcuate slote 47 struck on a radius from the turntable axis in the top of the base frame. The roller 45 moves horizontally with the turntable relative to the base frame and the arcuate slot in the top of the base frame permits such movement. Pressure fluid may be supplied to the centering cylinders 40 at the remote ends of the pistons through hoses 48, 48 connected to passages 49 in the outer cylinder heads and connected at their adjacent ends by a T 50 to a hose 51, the latter having communication with an axial passage 52 in the vertical pin 46. The passage 52 has fluid supplied thereto from the hose 37. It will thus be seen that pressure fluid may flow from the reversing valve 23 through the hose 37, passage 52 in the pin 46, hose 51, T 50, hoses 48, 48 and the passages 49 in the cylinder heads, concurrently to the cylinder bores. Arranged on the base frame beneath the turntable is a vertically disposed fluid cylinder 54 (Figs. 7 and 10) containing a reciprocable piston 55 having its piston rod 56 extending upwardly within the top cylinder head, and the upper end of this piston rod has formed thereon a locking pin 57 which is receivable in a locking recess 58 formed in the turntable 7. A coil spring 59 urges the piston downwardly toward its released position. A hose 60 communicates with the lower end of the cylinder 54 for supplying pressure fluid to the cylinder, and this hose is connected to one of the hoses 48 so that when pressure fluid is supplied to the centering cylinders, it is supplied concurrently to the locking cylinder. It will thus be seen that when the shovel supporting turntable is power-swung from a lateral position into alinement with the loader base, it is automatically locked into such position by the locking pin 57. When the centering cylinders are vented to atmosphere, the locking cylinder 54 is concurrently vented.

Now referring to the improved means for rendering the centering mechanism automatic so that the shovel is brought into alinement with the base whenever the shovel raising motor 21 is operated to raise the shovel from its digging position, it will be noted that the fluid supply hose 36 communicates with a supply passage 62 in the casing of the reversing valve 23, and this supply passage communicates with a valve chamber 63 (Figs. 12 and 14). This valve chamber is formed in the valve casing which is secured to the motor frame, and the chamber is closed at its outer side by a detachable end plate 64 providing a plane valve seat 65. A spring 66 arranged in the valve casing chamber constantly urges a reversing valve element 67, arranged in the chamber, against the valve seat. Upon flow of pressure fluid to the chamber 63, the fluid acts on the valve element to supplement the spring in the holding of the valve tightly against its seat. The lever arm 24 is secured to the outer end of a horizontal valve stem 68 which has an inner projection 69 interlocked with the valve element so that when the valve stem is rotated the valve element rotates therewith. When the operating handle 29 for the reversing valve 23 is swung forwardly to the left in Fig. 1, and the valve element 67 is positioned as shown in Figs. 12 and 14, pressure fluid may flow from the chamber 63 through a valve port 70 to a fluid supply passage 71 leading to a conventional automatic fluid distributing valve 72 rotatable at the same angular speed as the motor shaft, to effect running of the shovel motor in a direction to wind in the side chains 18 to raise the shovel from its digging position shown in full lines in Fig. 1. Concurrently, the reverse supply passage 73 of the shovel motor is connected to exhaust through an exhaust port 74 in the reversing valve. Pressure fluid may then flow from the motor supply passage 71 through the hose 37, through the passage 52, hose 51 and hoses 48, and through the passages 49 concurrently to the remote ends of the centering cylinders and to the locking cylinders, so that if the shovel is in a laterally located position, it will automatically be brought into alinement with the base and locked as the shovel moves upwardly toward its raised dumping position indicated in dotted lines in Fig. 1. When the shovel reaches its dumping position and has been abruptly stopped by the buffer springs, the shovel contents are discharged into the mine car M and the springs bounce the shovel forwardly past its center of gravity so that it may drop back down into its digging position. As the shovel starts forwardly, the operator may swing the handle 29 rearwardly to the right in Fig. 1 to position the reversing valve element 67 as shown in Fig. 15, and pressure fluid may flow from the chamber 63 through a valve port 70a to the fluid supply 73 leading to the automatic fluid distributing valve 72 to reverse the shovel raising motor 21 to cause the drums 19 to unwind the side chains 18 to permit the shovel to quickly drop down into its digging position. When the shovel motor 21 is reversed, the passage 71 is connected by the exhaust port 74 and port 75 in the valve element to an exhaust passage 76 leading to atmosphere, thereby concurrently exhausting the fluid from the centering and locking cylinders, through the hose 37, and as the shovel descends, the turntable may be freely turned by hand with respect to the base to locate the shovel into a digging position at the side of the trackway. Exhaust may occur through passages in the automatic distributing valve 72 or through separate exhaust passages independently of the distributing valve. To enable a relatively free exhaust of fluid from the centering and locking cylinders during lowering of the shovel, the valve port 74 is laterally notched at 77. When the handle 29 is in its central or neutral position, as shown in Figs. 1 and 4, the centering and locking cylinders are connected to exhaust through hose 37, passage 76, port 75, notch 77, valve port 74 and passage 71 as shown in Figs. 16, 17 and 18.

The reversing valve 23 and its associated fluid connections are shown diagrammatically in Figs. 19, 20 and 21. In Fig. 19, the reversing valve 23 is in a position to effect running of the shovel raising motor 21 in a direction to raise the shovel from its lowered digging position into its raised dumping position, and the supply hose 36 communicates through the passage 70 in the valve element 67 with the passage 71 leading to the distributing valve 72 of the motor. Concurrently, pressure fluid may flow from the passage 71 through the hose 37 and hoses 48, 48 to the remote ends of the centering cylinders 40 and through hose 60 to the locking cylinder 54. Thus, as the shovel moves upwardly from a laterally located digging position, it is automatically brought into alinement with the base so that dumping of the shovel contents into the mine car M is assured. After the shovel has discharged its contents, the buffer springs bounce the shovel forwardly past its center of gravity and the reversing valve is turned into the position shown in Fig. 20 and at that time pressure fluid may flow from the supply hose 36 through the valve passage 70a to the passage 73 leading to the distributing valve of the motor. Concurrently, the passage 71 is connected to the exhaust passage 76 through the valve exhaust port 74 so that the fluid in the centering cylinders 40 and the locking cylinder 54 is vented to atmosphere through hose 37. When the reversing valve 23 is in its central or neutral position shown in Fig. 21, the notch 77 connects the passage 71 to the exhaust passage 76 through the valve exhaust port 74 so that the centering cylinders 40 and locking cylinder 54 are vented to atmosphere through the hose 37. It will thus be seen when the reversing valve 23 is in either of the positions shown in Figs. 20 and 21 and the shovel is moving downwardly toward its digging position, the shovel may be easily moved laterally by hand on its turntable relative to the base. As the general mode of operation of a shovel loader of the type disclosed is well known to those skilled in the art and is fully described in the patents above referred to, further description thereof herein is unnecssary. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In a material loading apparatus, the combination comprising a base, a frame swivelled on said base, fluid actuated centering means on said base and operatively connected to an element on said frame for centering the latter relative to said base, a fluid supply connection on said frame, said element having a fluid passage therethrough to which said supply connection is connected, and a fluid supply connection leading from said passage to said centering means.

2. In a material loading apparatus, the combination comprising a base element, a frame element swivelled on said base element to swing horizontally with respect thereto about a vertical axis, one of said elements having a vertical tubular member fixed thereto and so arranged as to permit swivelling of said frame element, fluid actuated self-centering means on said base element and operatively connected to said frame element for swivelling said frame element relative to said base element to bring said elements into alinement, a fluid supply connection on said frame element and connected to said tubular member for conducting fluid thereto, and a fluid connection for conducting fluid from said tubular member to said self-centering means.

LESLIE A. CURRIER.
FIESCO B. ENGEL.

REFERENCES CITED

The following references are of record in the file of this patent:

UNITED STATES PATENTS

| Number | Name | Date |
|---|---|---|
| 2,201,671 | Osgood | May 21, 1940 |
| 2,268,569 | Osgood | Jan. 6, 1942 |
| 2,268,570 | Osgood | Jan. 6, 1942 |
| 2,365,773 | Osgood | Dec. 26, 1944 |